United States Patent
Ata et al.

(10) Patent No.: US 9,021,252 B2
(45) Date of Patent: Apr. 28, 2015

(54) ENCRYPTED-TRAFFIC DISCRIMINATION DEVICE AND ENCRYPTED-TRAFFIC DISCRIMINATION SYSTEM

(75) Inventors: Shingo Ata, Osaka (JP); Go Hasegawa, Osaka (JP); Yoshihiro Nakahira, Osaka (JP); Nobuyuki Nakamura, Osaka (JP)

(73) Assignees: Osaka City University, Osaka (JP); Osaka University, Osaka (JP); Oki Electric Industry Co., Ltd., Tokyo (JP)

( * ) Notice: Subject to any disclaimer, the term of this patent is extended or adjusted under 35 U.S.C. 154(b) by 824 days.

(21) Appl. No.: 12/659,069

(22) Filed: Feb. 24, 2010

(65) Prior Publication Data

US 2010/0223455 A1     Sep. 2, 2010

(30) Foreign Application Priority Data

Mar. 2, 2009   (JP) ................. 2009-048176

(51) Int. Cl.
    *H04L 29/06*      (2006.01)
    *H04L 12/851*     (2013.01)

(52) U.S. Cl.
    CPC ........ *H04L 63/0428* (2013.01); *H04L 47/2441* (2013.01)

(58) Field of Classification Search
    CPC .................. H04L 47/2441; H04L 63/0428
    USPC .................. 713/150, 153–154; 709/223–224
    See application file for complete search history.

(56) References Cited

U.S. PATENT DOCUMENTS

| | | | |
|---|---|---|---|
| 5,548,646 A * | 8/1996 | Aziz et al. ...................... 713/153 |
| 6,363,053 B1 * | 3/2002 | Schuster et al. ............... 370/230 |
| 6,452,950 B1 * | 9/2002 | Ohlsson et al. ............... 370/516 |
| 6,917,588 B1 * | 7/2005 | Cao et al. ...................... 370/230.1 |
| 7,103,065 B1 * | 9/2006 | Quigley et al. ............... 370/465 |
| 7,170,860 B2 * | 1/2007 | Partridge et al. ............. 370/252 |
| 7,447,768 B2 * | 11/2008 | Kelly et al. ...................... 709/224 |

(Continued)

FOREIGN PATENT DOCUMENTS

JP       2006-146039 A       6/2006

OTHER PUBLICATIONS

Gong et al.; Trade-offs in routing private multicast traffic; Published in: Global Telecommunications Conference, 1995; GLOBECOM '95., IEEE (vol. 3 ); Date of Conference: Nov. 14-16, 1995; pp. 2124-2128 vol. 3; Meeting Date: Nov. 13, 1995-Nov. 17, 1995; IEEE Xplore.*

(Continued)

*Primary Examiner* — Bradley Holder
(74) *Attorney, Agent, or Firm* — Rabin & Berdo, P.C.

(57) ABSTRACT

An encrypted-traffic discrimination device includes an input interface, a flow discrimination section, a data accumulation section, a selective data calculation section, a calculation result determination section, and an output interface. The flow discrimination section discriminates the input traffic into separate flows based on at least a transmission origin address and a transmission destination address. The data accumulation section accumulates characteristic amount data of the traffic for each of the separate flows. The selective data calculation section executes an evaluation computation utilizing specific data from the characteristic amount data. The calculation result determination section that, based on a calculated evaluation computation value, executes threshold value determination to determine whether or not the traffic is encrypted, and, if the traffic is determined to be encrypted, which encryption format the traffic is encrypted with.

14 Claims, 7 Drawing Sheets

(56) References Cited

U.S. PATENT DOCUMENTS

| | | | |
|---|---|---|---|
| 7,506,156 B2* | 3/2009 | Christensen et al. | 713/153 |
| 7,516,485 B1* | 4/2009 | Lee et al. | 726/11 |
| 7,536,546 B2* | 5/2009 | MeLampy et al. | 713/162 |
| 7,664,048 B1* | 2/2010 | Yung et al. | 370/253 |
| 7,778,194 B1* | 8/2010 | Yung | 370/252 |
| 7,797,741 B2* | 9/2010 | Kim et al. | 726/22 |
| 8,417,942 B2* | 4/2013 | Dunn et al. | 713/160 |
| 8,539,064 B1* | 9/2013 | Wang et al. | 709/224 |
| 2003/0097595 A1* | 5/2003 | Partridge et al. | 713/201 |
| 2006/0137011 A1* | 6/2006 | Kim et al. | 726/22 |
| 2006/0172722 A1* | 8/2006 | Christensen et al. | 455/410 |
| 2007/0214504 A1* | 9/2007 | Milani Comparetti et al. | 726/23 |
| 2009/0063856 A1* | 3/2009 | Dunn et al. | 713/160 |
| 2009/0178061 A1* | 7/2009 | Sandoval et al. | 719/328 |
| 2009/0327695 A1* | 12/2009 | Molsberry et al. | 713/151 |
| 2010/0138910 A1* | 6/2010 | Aldor et al. | 726/14 |

OTHER PUBLICATIONS

Kaya et al.; Published in: Proceeding SASN '03 Proceedings of the 1st ACM workshop on Security of ad hoc and sensor networks; 2003; pp. 94-103; ACM Digital Library.*

Laurent, Bernaille, et al., "Early recognition of encrypted applications", 8th International Conference on Passive and Active Network Measurement, PAM 2007, Lecture notes in computer science 4427, pp. 165-175, 2007.

Chinese Office Action dated Jul. 23, 2012 issued in the corresponding Chinese Patent Application.

* cited by examiner

SIMPLE AVERAGE

FIG.6B

ARRIVAL INTERVAL DURATION OF 75TH PERCENTILE
OF DATA  SET  OF ARRIVAL INTERVAL DURATIONS
ORDERED IN SEQUENCE FROM THE SHORTEST

FIG.7A

SIMPLE AVERAGE

FIG.7B

VARIANCE VALUE OF PACKET LENGTH

FIG.7C

AVERAGE VALUE OF PACKET LENGTH OF PACKETS FROM WHICH ACK PACKETS HAVE BEEN REMOVED

ENCRYPTED-TRAFFIC DISCRIMINATION DEVICE AND ENCRYPTED-TRAFFIC DISCRIMINATION SYSTEM

CROSS-REFERENCE TO RELATED APPLICATION

This application claims priority under 35 USC 119 from Japanese Patent Application No. 2009-048176, filed on Mar. 2, 2009, the entire disclosure of which is incorporated by reference herein.

BACKGROUND OF THE INVENTION

1. Field of the Invention

The present invention is related to an encrypted-traffic discrimination (identification) device that monitors traffic flowing over a network such as the internet, at, for example, a node or terminal on the network, and readily discriminates with high precision whether or not the traffic is encrypted text or plain text, and to an encrypted-traffic discrimination (identification) system of the same.

2. Description of the Related Art

There is a conventional technique for extracting characteristics of encrypted data that operates as follows. First, encrypted text that has been encrypted with a given encryption method is generated by an encryption signal transmission section, and this test communication signal data is collected and the characteristics thereof determined. Next, in an encryption determination section, characteristic information (data) is collected for communication data for which the type of traffic is not known, and this characteristic information is compared with characteristic information for known encrypted text which has been already determined. When these match, the traffic of unknown type is inferred to be data encrypted by a known encryption method. Combinations of communication application, encrypted communication software, and encryption protocols can be identified as types of encrypted communication according to this method. Examples of protocols that can be used as such encryption protocols include, for a WEB service, Hypertext Transfer Protocol Security (HTTPS) (Secure Socket Layer (SSL)), and for a Virtual Private Network (VPN), Data Encryption Standard (DES), 3DES, and Advanced Encryption Standard (AES), and the like. Examples of data used for extraction of characteristics of encrypted data include, for example:

(1) generation interval between communication sessions
(2) packet generation interval within communication session
(3) packet size within communication session
(4) total packet count within communication session
(5) relationship of packet transmission and reception directions within communication session
(6) ratio of packet transmission and reception directions within communication session
(7) protocol occupancy within communication session
(8) each packet size at start of communication session
(9) total packet count at start of communication session
(10) total data size at start of communication session
(11) Source/Destination IP distribution over a long interval
(12) Destination Port distribution over a long interval
(13) Presence or absence of queries to DNS server over a long interval
(14) Presence or absence of transmission data during which no data is transmitted from the communication application side. (See Japanese Patent Application Laid-Open (JP-A) No. 2006-146039).

However, in the technology according to JP-A No. 2006-146039, even using data relating to the above (1) to (14), it is not always the case that the type of communication, and specifically, whether or not the traffic being communicated is encrypted text, can be easily determined.

Therefore, there is a requirement for a encrypted-traffic discrimination device that acquires and computes data of characteristics of traffic being communicated over a network, and, based on this data, easily and correctly determines whether or not the traffic is encrypted text.

SUMMARY OF THE INVENTION

A first aspect of the present invention is an encrypted-traffic discrimination device including: an input interface to which traffic is input; a flow discrimination section that discriminates the input traffic into separate flows based on at least a transmission origin address and a transmission destination address; a data accumulation section-that accumulates characteristic amount data of the traffic for each of the separate flows; a selective data calculation section that executes an evaluation computation utilizing specific data from the characteristic amount data; a calculation result determination section that, based on a calculated evaluation computation value, executes threshold value determination to determine whether or not the traffic is encrypted, and, if the traffic is determined to be encrypted, which encryption format the traffic is encrypted with; and an output interface that outputs a result of the determination.

BRIEF DESCRIPTION OF THE DRAWINGS

Exemplary embodiments of the present invention will be described in detail based on the following figures, wherein:

FIG. 6A is a distribution graph of evaluation computation values derived by an encrypted-traffic discrimination device using a conventional method, FIG. 7A is a distribution graph of evaluation computation values derived by an encrypted-traffic discrimination device using a conventional method.

DETAILED DESCRIPTION OF THE INVENTION

First Exemplary Embodiment

Overall Configuration of Encrypted-traffic discrimination Device

Figure 1:
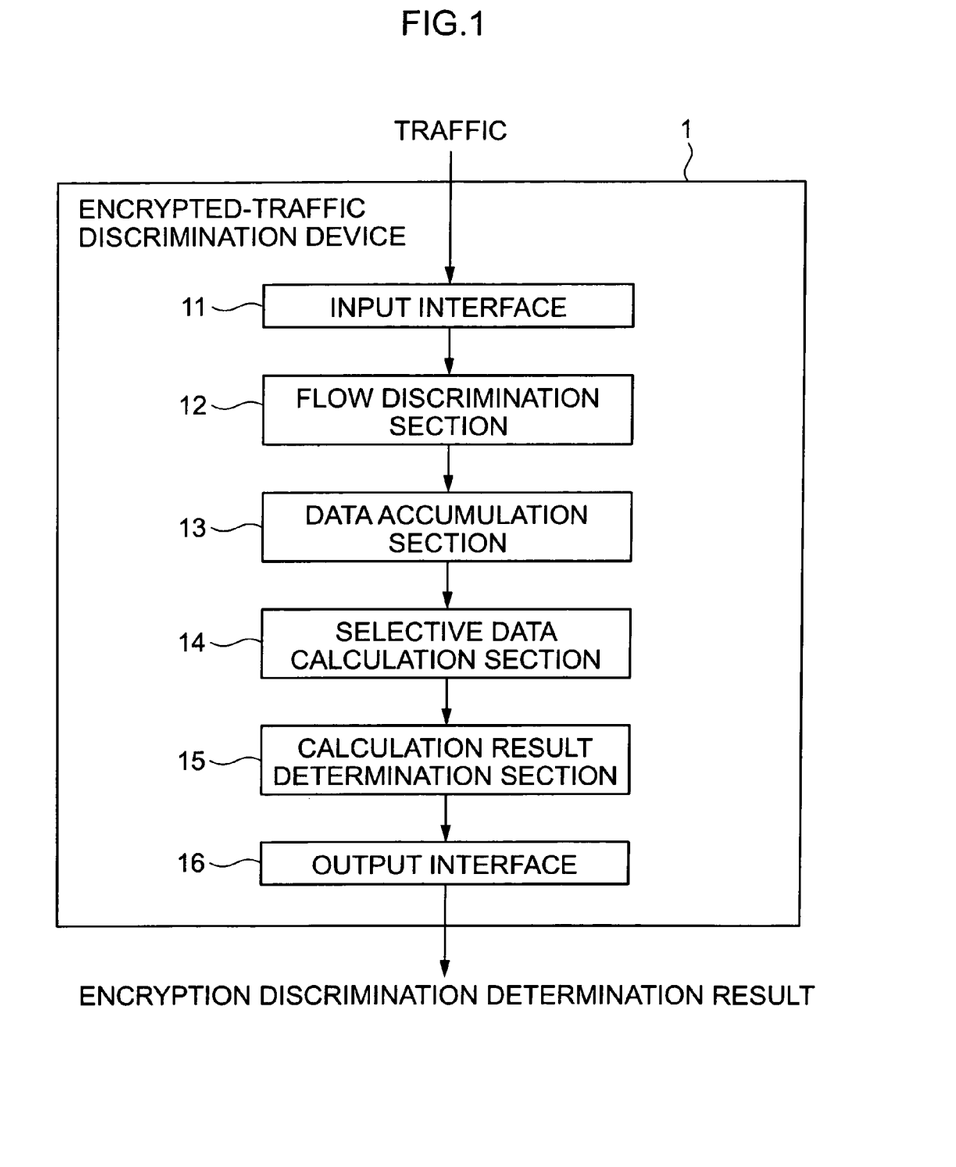
FIG. 1 is an overall configuration diagram of an encrypted-traffic discrimination device according to a first exemplary embodiment.

FIG. 1 is an overall configuration diagram of an encrypted-traffic discrimination device according to a first exemplary embodiment.

In FIG. 1, an input interface 11 inputs traffic to be monitored to the encrypted-traffic discrimination device. The input interface 11 is connected to a flow discrimination section 12 that discriminates the input traffic into separate flows based on, for example, the transmission origin IP address and the transmission destination IP address in the input traffic. Flow represents bundled data of packets with the same transmission origin IP address and same transmission destination IP address. Packets are component units of transmission and reception data of traffic or flow. The flow discrimination section 12 is connected to a data accumulation section 13 that accumulates characteristic amount data in the discriminated flows separately by flow. The data accumulation section 13 is connected to a selective data calculation section 14 that executes evaluation computation based on the characteristic amount data. The selective data calculation section 14 is connected to a calculation result determination section 15 that executes threshold value determination based on the values of the evaluation computation, to determine whether or not the traffic is encrypted, and which encryption format is used when the traffic is encrypted. The calculation result determination section 15 is connected to an output interface 16 that externally outputs the above determination results. As described above, the encrypted-traffic discrimination device 1 includes the input interface 11, the flow discrimination section 12, the data accumulation section 13, the selective data calculation section 14, the calculation result determination section 15, and the output interface 16. The above components of the encrypted-traffic discrimination device 1, may be physically independent units, may represent ideational functionality provided to a control device (not shown in the figures) of the encrypted-traffic discrimination device 1, or each of the above configuration requirements 11 to 16 may be a different device, with these devices connected together.

Figure 2:
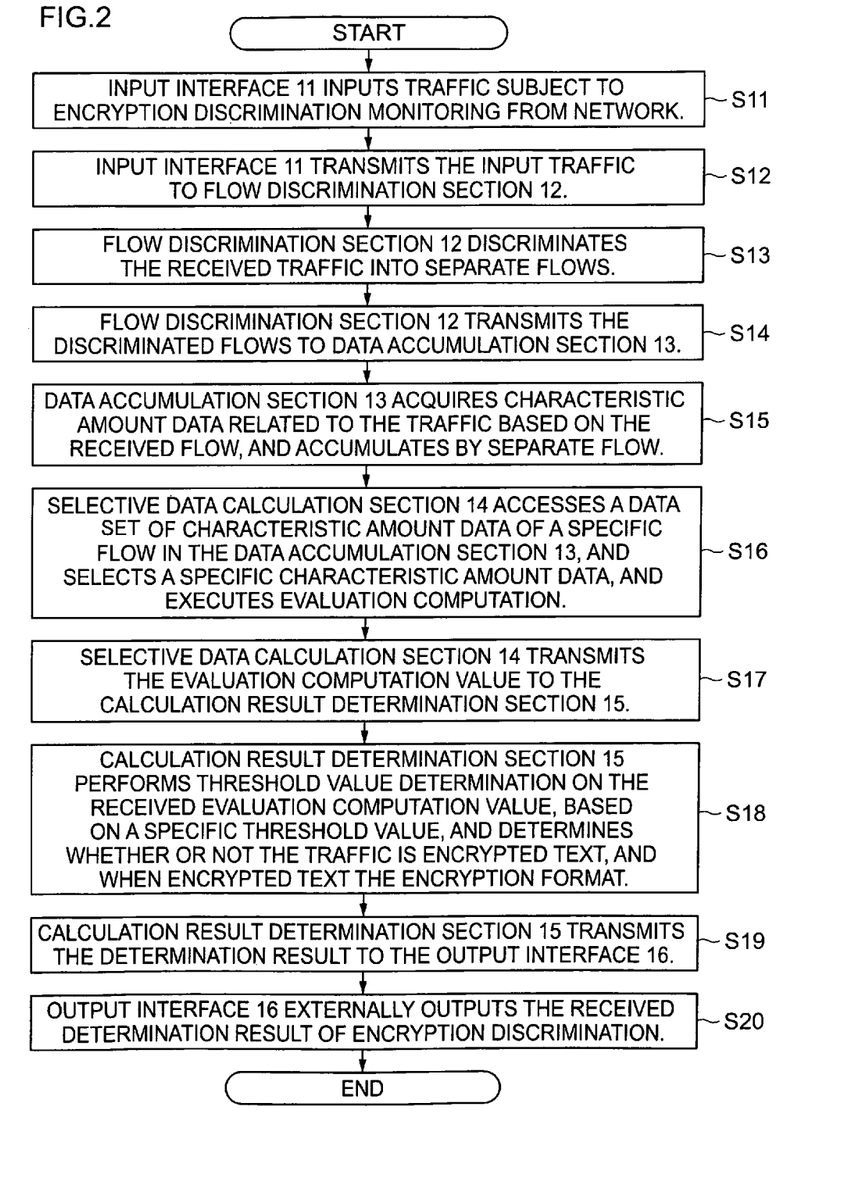
FIG. 2 is a flow chart showing encryption discrimination operation of the encrypted-traffic discrimination device.

Encryption Discrimination Operation of the Encrypted-Traffic Discrimination Device FIG. 2 is a flow chart showing encryption discrimination operation of the encrypted-traffic discrimination device according to the first exemplary embodiment.

(S11)
The input interface 11 extracts, from a location on a network, such as, for example, an external LAN or the Internet, where monitoring of encryption discrimination is to be performed, traffic being communicated over the network, and inputs the extracted traffic to the encrypted-traffic discrimination device. For example, the input interface 11 extracts and inputs traffic communicated over the network from a mirror port provided, for example, at a TAP device, a router, a switching hub.

(S12)
The input interface 11 transmits the input traffic to the flow discrimination section 12.

(S13)
The flow discrimination section 12 discriminates the received traffic into separate flows based on the transmission origin IP address and the transmission destination IP address packaged in the received traffic, and based on the transmission origin port number and the transmission destination port number.

(S14) The flow discrimination section 12 transmits the discriminated flows to the data accumulation section 13.

(S15)
The data accumulation section 13 acquires characteristic amount data related to the traffic based on the received flow, and accumulates the characteristic amount data by separate flow. As a method for accumulating the characteristic amount data separated by flow, storage may be made on respective physically separate storage media, or accumulation may be made in a time-series on the same storage medium with identification data associated therewith to enable identification of which data belongs to which flow, or alternatively a configuration may be adopted in which characteristic amount data related to traffic by separate flow can be acquired with a known method. In the present exemplary embodiment, the characteristic amount data related to traffic is the arrival interval duration of packets of the traffic.

(S16)
The selective data calculation section 14 accesses a specific flow subjected to encryption discrimination monitoring from all of the characteristic amount data accumulated by flow in the data accumulation section 13, and selects a specific characteristic amount data from a data set of the characteristic amount data in this flow, and executes evaluation computation thereon. In the present exemplary embodiment, the evaluation computation value is derived by the following method. The selective data calculation section 14 orders (sorts) the data set of the packet arrival interval durations of the packets, which are the above accessed specific characteristic amount data, into sequence, starting from the shortest arrival interval duration. The selective data calculation section 14 then acquires data of arrival interval duration(s) corresponding to a specific portion thereof (for example, the 75 percentile of the total data set count from the shortest), and takes this as the evaluation computation value.

(S17)
The selective data calculation section 14 transmits the evaluation computation value derived by the above method to the calculation result determination section 15.

(S18)
The calculation result determination section 15 performs threshold value determination on the received evaluation computation values, based on a specific threshold value; and determines whether the traffic is encrypted text that has been encrypted, or is plain text that has not been encrypted. Furthermore, when the traffic is determined to be encrypted text, determination is made of the encryption format thereof.

(S19)
The calculation result determination section 15 transmits the determination result of the encryption discrimination of Step S18 to the output interface 16.

(S20)
The output interface 16 externally outputs the received determination result of encryption discrimination.

The above operations may be continuously repeated, or may be executed at times deemed necessary and for durations deemed necessary, for example, by a network manager.

Effect of the First Exemplary Embodiment

Configuration and operation in the above manner enables encryption discrimination between encrypted text and plain text with a higher precision in comparison to conventional technology. Furthermore, when the traffic is determined to be encrypted text, there is also capability to discriminate the encryption format thereof.

At above step S15, the characteristic amount data related to the traffic in the received flow is acquired, and then is accumulated separately by flow. However, configuration may be made in which all of this characteristic amount data is not continuously accumulated, and instead, initially or at constant time intervals, an average value is calculated and characteristic amount data that should be excluded is determined. Then, data clearly falling outside the specific portions of the data that are to be used for evaluation computation values may be excluded from accumulation, and only the data considered to be around the vicinity of the minimum values and data considered to be around the vicinity of the maximum values may be stored. Such case enables to the processing burden to be reduced.

Furthermore, in the present exemplary embodiment, there is a single encrypted-traffic discrimination device 1; however embodiments are not limited thereto. Plural encrypted-traffic discrimination devices 1 may be disposed and the input traffic may be distributed therebetween. Alternatively, not all of the traffic is input, and sampling of the traffic may be performed at specific intervals. In such cases, the processing load on the encrypted-traffic discrimination device 1 can be reduced when a network environment is employed in which, for example, the encrypted-traffic discrimination device 1 is connected to a network configured by ultra-high speed lines, and traffic from this network is input to the input interface 11.

Furthermore, the evaluation computation by the selective data calculation section 14 is not limited to that described above. For example, an average value may be computed of data in a specific region (for example, data from the 0 percentile to the $75^{th}$ percentile of the data set count from the shortest), from the data set sorted in sequence from the shortest arrival interval duration as described above, and this average value taken as the evaluation computation value. By taking the average value of data by such a method, when the data with arrival interval duration corresponding to $75^{th}$ percentile of above step S16 is abnormal data or the like, occurrences of mis-determination of encryption discrimination can be avoided.

Furthermore, the selective data calculation section 14 can compute an index value of the arrival interval duration according to the following Equation (1), and the arrival interval duration index value can be taken as the evaluation computation value.

$$\text{Arrival interval duration index value} = \Sigma\Sigma\{(x^{th}\text{ arrival interval duration})^2/(a+(x/N-0.75)^2)\} \quad (1)$$

wherein:
N is the count of the data set,
x is the sequence number from the first data in the sorted data set, and
a is a specific constant (positive constant, determining the strength of influence of the $75^{th}$ percentile).

It has been discovered by the inventors that in the arrival interval duration index value computed according to above Equation (1), the closer data is to that of the $75^{th}$ percentile, the greater the influence when determining the value of the arrival interval duration index value. Consequently, not only can occurrences of mis-determination of encryption discrimination be avoided when the data at the arrival interval duration corresponding to the $75^{th}$ percentile as shown in step S16 is abnormal data or the like, but also precision can be made to approach that of the high encryption discrimination employing the data at the $75^{th}$ percentile. Note that in the above Equation (1), computation is made based on the values of the $75^{th}$ percentile; however when reference is made in the present exemplary embodiment to the vicinity of the $75^{th}$ percentile, this includes a region of about 1% on both sides thereof which show similar results. Although a result expressing a preferable value is obtained by the $75^{th}$ percentile, in the present exemplary embodiment, there is no limitation to employing data at the $75^{th}$ percentile, and evaluation computation may be based on another sequence number. There is also a possibility of obtaining a similar good result even with a completely different value, for example at 50%±5%.

Furthermore, in the above explanation, the data accumulation section 13 acquires the arrival interval duration of the packets of the traffic as the characteristic amount data related to the traffic; however embodiments are not limited thereto. For example, the packet length of the packets of the flow may be accumulated as the characteristic amount data. In such case, the selective data calculation section 14 may access the data set of packet lengths, which is the characteristic amount data, accumulated in the data accumulation section 13, compute a variance value of the data set of the packet lengths, and take this variance value as the evaluation computation value.

The data accumulation section 13 may, for example, accumulate, as the characteristic amount data, packet lengths of packets of the received flow, excluding ACK (acknowledgement) packets. In such case, the selective data calculation section 14 may access the data set of packet lengths of the packets excluding the ACK packets, which are the characteristic amount data accumulated in the data accumulation section 13, compute an average value of the data set of these packet lengths, and take this average value as the evaluation computation value.

Second Exemplary Embodiment

Overall Configuration of Encrypted-Traffic Discrimination Device

Figure 3:
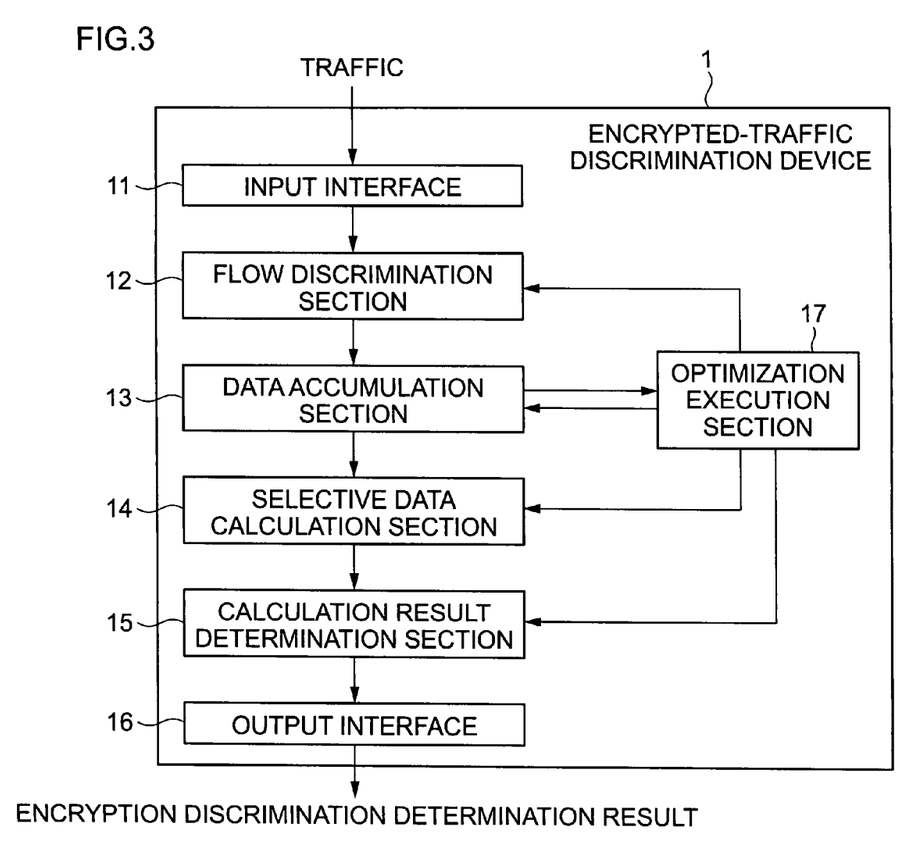
FIG. 3 is an overall configuration diagram of an encrypted-traffic discrimination device according to a second exemplary embodiment.

FIG. 3 is an overall configuration diagram of an encrypted-traffic discrimination device according to a second exemplary embodiment. Explanation follows concentrating on the parts of the configuration and operation that differ from those of the first exemplary embodiment.

As shown in FIG. 3, the encrypted-traffic discrimination device 1 according to the second exemplary embodiment has an optimization execution section 17 added to the encrypted-traffic discrimination device 1 according to the first exemplary embodiment. The optimization execution section 17 is connected to the flow discrimination section 12, the data accumulation section 13, the selective data calculation section 14, and the calculation result determination section 15. The optimization execution section 17 may be provided as a physically separate unit, or may represent ideational functionality provided to a control device (not shown in the figures) of the encrypted-traffic discrimination device 1.

Operation of the Optimization Execution Section

The optimization execution section 17 accesses the characteristic amount data accumulated by separate flow in the data accumulation section 13, and, based on the characteristic amount data, dynamically changes the operation of each of the components of the encrypted-traffic discrimination device 1, as explained below.

The optimization execution section 17 causes the flow discrimination section 12 to select a different flow discrimination operation method as well as the flow discrimination method of the traffic of step S13 shown in FIG. 2 of the first exemplary embodiment, such that encryption discrimination is performed by an optimal flow discrimination method.

The optimization execution section 17 causes the data accumulation section 13 to select arrival interval durations of packets, packet length of packets, or other characteristics of packets, in the discriminated flows transmitted from the flow discrimination section 12, to accumulate on a storage medium as an optimum characteristic amount data for encryption discrimination. When this is performed, if the flows are discriminated by the flow discrimination section 12 using a different method from that of the first exemplary embodiment, the data accumulation section 13 accumulates the characteristic amount data related to these flows in a different region on the storage medium from where the characteristic amount data related to the flows discriminated by the method according to the first exemplary embodiment was accumulated. Instead of accumulating in a different region on the storage medium as described above, discrimination data for flow classification may be additionally associated with the accumulated characteristic amount data.

Furthermore, the optimization execution section 17 causes the selective data calculation section 14 to select the characteristic amount data to be employed, or the range of the data set of the characteristic amount data to be employed, when performing evaluation computation based on the characteristic amount data by accessing the data accumulation section 13, such that computation of the evaluation computation values is made by an optimum computation method for encryption discrimination.

The optimization execution section 17 causes the calculation result determination section 15 to select the threshold value for determination when executing threshold value determination on the evaluation computation values computed by the selective data calculation section 14, such that determination is performed by an optimum threshold value for encryption discrimination. The evaluation computation value can be computed, for example, by an exemplary method 1 described below. "Optimization" means using a value that is more appropriate for encryption discrimination than the value of the $75^{th}$ percentile used in the exemplary method 1, for example. "Optimum" may specifically means, for example, employing a value that gives the maximum distance for the closest proximity along the horizontal axis of the each of the lines on the graph (plain text, HTTPS, and Point-to-Point Tunneling Protocol (PPTP)) in FIG. 6B, and that the rate of false determinations can thereby be reduced. Alternatively, "optimum" value may be referred to a value such that the distance is increased in most cases, even-if the closest proximity decreases slightly in a section of the region, and that minimizes the false determination rate overall. "Optimum" does not necessarily indicate the optimal level with respect to encryption discrimination, and encompasses cases where the level of encryption discrimination power is raised when the optimization execution section 17 is employed in comparison to cases where an optimization execution section is not employed (such as in the first exemplary embodiment).

Effect of Second Exemplary Embodiment

According to the configuration and operation as described above, by dynamically changing operation of each of the components of the encrypted-traffic discrimination device 1 with the optimization execution section 17, the optimal flow discrimination method, the optimal characteristic amount data to be employed, the optimal evaluation computation values, and the optimal determination threshold values can be dynamically selected and determined for encryption discrimination.

Third Exemplary Embodiment

Overall Configuration of Encrypted-Traffic Discrimination Device

Figure 4:
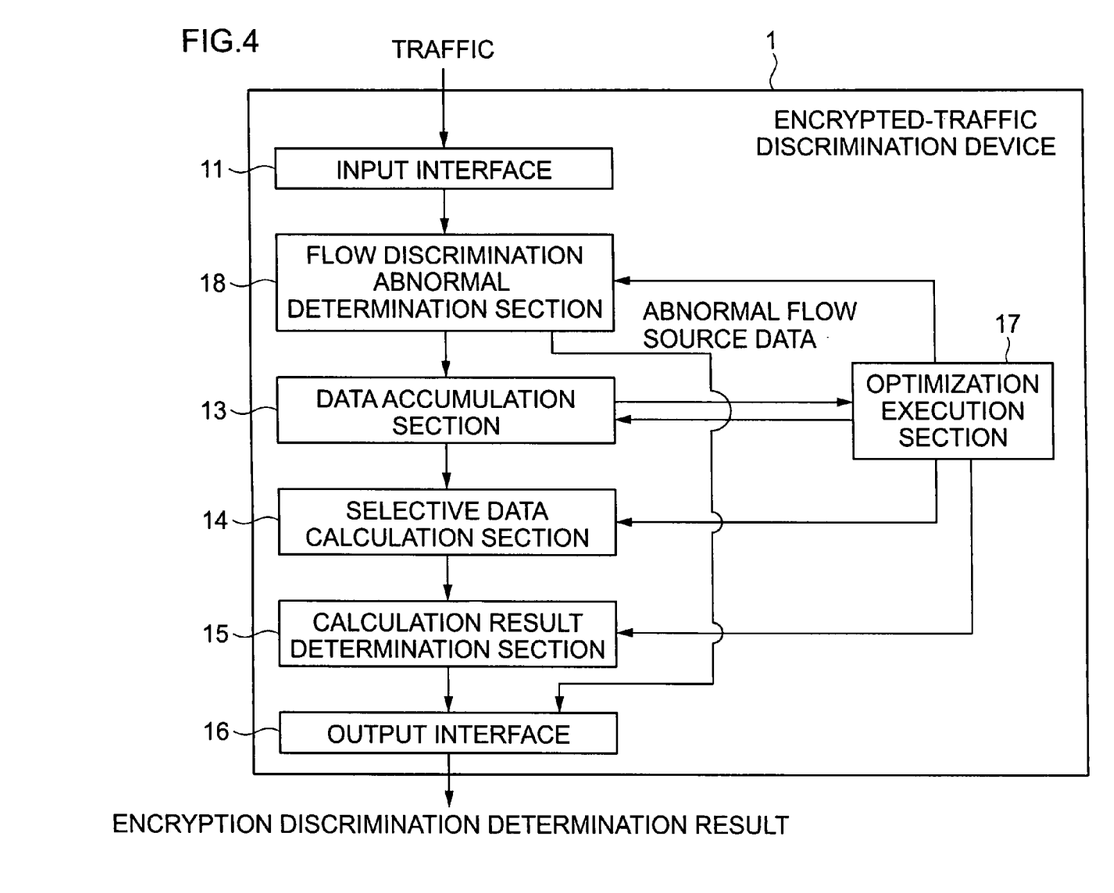
FIG. 4 is an overall configuration diagram of an encrypted-traffic discrimination device according to a third exemplary embodiment.

FIG. 4 is an overall configuration diagram of an encrypted-traffic discrimination device according to a third exemplary embodiment. Explanation follows concentrating on the parts of the configuration and operation that differ from those of the second exemplary embodiment.

As shown in FIG. 4, the encrypted-traffic discrimination device 1 according to the present exemplary embodiment has a flow discrimination/abnormal determination section 18 disposed in place of the flow discrimination section 12 of the encrypted-traffic discrimination device 1 according to the second exemplary embodiment. In the third exemplary embodiment, the flow discrimination/abnormal determination section 18 also is imparted with the functionality of the above flow discrimination section 12.

Operation of the Flow Discrimination/Abnormal Determination Section

The input interface 11 that has input, to the encrypted-traffic discrimination device, traffic from a location subjected to monitoring of encryption discrimination on a network, such as an external LAN, the Internet, transmits the traffic to the flow discrimination/abnormal determination section 18. The flow discrimination/abnormal determination section 18 that has received the traffic, discriminates the traffic into separate flows similarly to the flow discrimination section 12 in the second exemplary embodiment, and at the same time executes abnormality determination of the traffic. When the flow discrimination/abnormal determination section 18 determines that the flow is abnormal, data relating to the source of the abnormality, such as, from which network the abnormal flow was transmitted, or from which node on the network the abnormal flow was transmitted, is transmitted to the output interface 16. The flow discrimination/abnormal determination section 18 transmits this abnormal flow to the data accumulation section 13. Then encryption discrimination is determined for this abnormal flow similarly to in the second exemplary embodiment. The output interface 16 externally outputs the received data related to the abnormality source.

Effect of the Third Exemplary Embodiment

By configuration and operation as described above, external output, as a warning, of data relating to the network and/or the node outputting the abnormal flow is enabled, and, for example, a manager of the network confirmed this warning is able to use the output data relating to the abnormality source to solve the abnormality.

While in the present exemplary embodiment, encryption discrimination is executed on the flow that is determined to be abnormal by the flow discrimination/abnormal determination section 18 in the subsequent stages of the selective data calculation section 14 and the calculation result determination section 15, embodiments are not limited thereto. For example, when encryption discrimination for abnormal flows is not required, the flow discrimination/abnormal determination section 18 may simply output data relating the source of abnormality, without execution of encryption discrimination at later stages.

In the present exemplary embodiment, the flow discrimination/abnormal determination section 18 performs encryption discrimination on both normal flows and abnormal flows; however embodiments are not limited thereto. Encryption discrimination may be executed only when abnormal flows are discriminated. In such case, a network manager does not need to monitor all of the time, and the encryption discrimination is automatically executed when an abnormal flow is discriminated, and corresponding notification of this result can be made to the manager in order to take any action thereto, thereby also contributing to energy saving in the encrypted-traffic discrimination device 1.

In the above explanation, the flow discrimination/abnormal determination section 18 is described to also imparted with the functionality of the flow discrimination section 12 from the second exemplary embodiment. However, the flow discrimination/abnormal determination section 18 can be configured not been provided with the functionality of the flow discrimination section, 12, and a functionality for determining abnormal flow may be provided separately to the flow discrimination section 12, either internally or externally to the encrypted-traffic discrimination device 1, at a stage preceding the input interface 11.

Furthermore, in the present exemplary embodiment, although when the flow discrimination/abnormal determination section 18 determines that the flow is abnormal, the data relating to the source of the abnormality is directly transmitted to the output interface 16, the embodiments are not limited thereto. For example, the data relating to the source of the abnormality may be transmitted to the output interface 16 via the data accumulation section 13, the selective data calculation section 14, and/or the calculation result determination section 15. Any of these cases are applicable as long as the data relating to the source of the abnormality output by the flow discrimination/abnormal determination section 18 is finally transmitted to the output interface 16.

Fourth Exemplary Embodiment

Overall Configuration of Encrypted-Traffic Discrimination System

Figure 5:
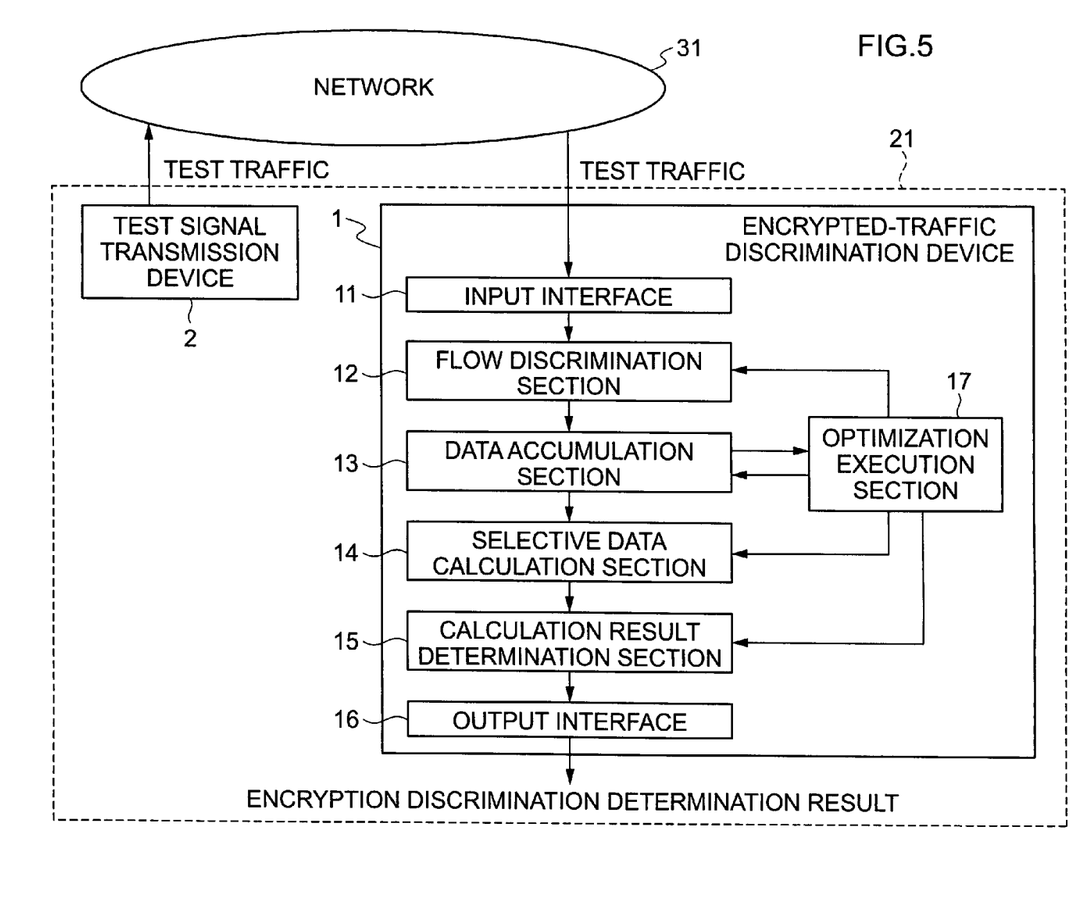
FIG. 5 is an overall configuration diagram of an encrypted-traffic discrimination system according to a fourth exemplary embodiment.

FIG. 5 is an overall configuration diagram of an encrypted-traffic discrimination system according to a fourth exemplary embodiment. The fourth exemplary embodiment is a system that employs the encrypted-traffic discrimination device of the second exemplary embodiment described above, and explanation follows concentrating on parts of the configuration and the operation that are different from those of the encrypted-traffic discrimination device of the second exemplary embodiment.

As shown in FIG. 5, the encrypted-traffic discrimination system 21 according to the present exemplary embodiment is configured to including the encrypted-traffic discrimination device 1 according to the second exemplary embodiment, and an external test signal transmission device 2 that transmits traffic employed for tests. The test signal transmission device 2 may be incorporated within the encrypted-traffic discrimination device 1. Also in such case, the system including the encrypted-traffic discrimination device 1 and the test signal transmission device 2 is referred to as the encrypted-traffic discrimination system 21. The test signal transmission device 2 and the encrypted-traffic discrimination device 1 are preferably separated network-wise by some distance. Due to this configuration, as the traffic for evaluation comes from a network other than itself and therefore is influenced by the communication lines it passes through on the way in a similar manner, a test signal flow to obtain an optimum value can also be received in a state that has received influence from transmission lines as well. When the encrypted-traffic discrimination device 1 and the test signal transmission device 2 are incorporated within a same casing, these devices are preferably connected to different providers, or the plural encrypted-traffic discrimination systems are prepared which are mutually separated network-wise and the test signals are transmitted and received therebetween.

Operation of Encrypted-Traffic Discrimination System

First, the test signal transmission device 2 transmits test traffic to a network 31. Next, the encrypted-traffic discrimination device 1 receives the test traffic via the network 31. For the test traffic, as explained in the second exemplary embodiment, operation of each of the components configuring the encrypted-traffic discrimination device 1 is dynamically changed by the optimization execution section 17 in the encrypted-traffic discrimination device 1, and the optimal flow discrimination method, characteristic amount data, evaluation computation values, and determination threshold values are selected for encryption discrimination. Note that a device having a functionality that can send and transmit a control signal between the external test signal transmission device 2 and the encrypted-traffic discrimination device 1, which is the main device, can be installed in the configuration described above. Thereby, the type of signal to be transmitted by the test signal transmission device 2 can be determined in advance, and the type of the transmission signal can be transmitted to the encrypted-traffic discrimination device 1 by the control signal. Thus, the optimum conditions for the encryption discrimination can be more favorably decided for each of the encryption formats, and these conditions can be stored in the encrypted-traffic discrimination system 21.

Effect of the Fourth Exemplary Embodiment

According to the above configuration and operation, the optimum conditions for encryption discrimination can be correctly determined for respective network environment.

In the present exemplary embodiment, the encrypted-traffic discrimination system 21 is described to be provided with components of the encrypted-traffic discrimination device 1 according to the second exemplary embodiment, and the encrypted-traffic discrimination device 1. However, embodiments are not limited thereto, and the encrypted-traffic discrimination device 1 according to the first exemplary embodiment or the third exemplary embodiment may be provided. In particular, when the encrypted-traffic discrimination device 1 according to the first exemplary embodiment is provided, by the external test signal transmission device 2 transmitting via the network 31 encrypted test traffic using various encryption formats, the encrypted-traffic discrimination device 1 can confirm capability for correct encryption discrimination for such test traffic. Consequently, setting of optimal encryption discrimination conditions is enabled.

Exemplary Method for Deriving Evaluation Computation Values

Next, explanation of methods for deriving evaluation computation values in the encrypted-traffic discrimination device and encrypted-traffic discrimination system of the exemplary embodiments will be provided. However methods of deriving the evaluation computation values are not limited to these.

Exemplary Method 1

Figure 6A:
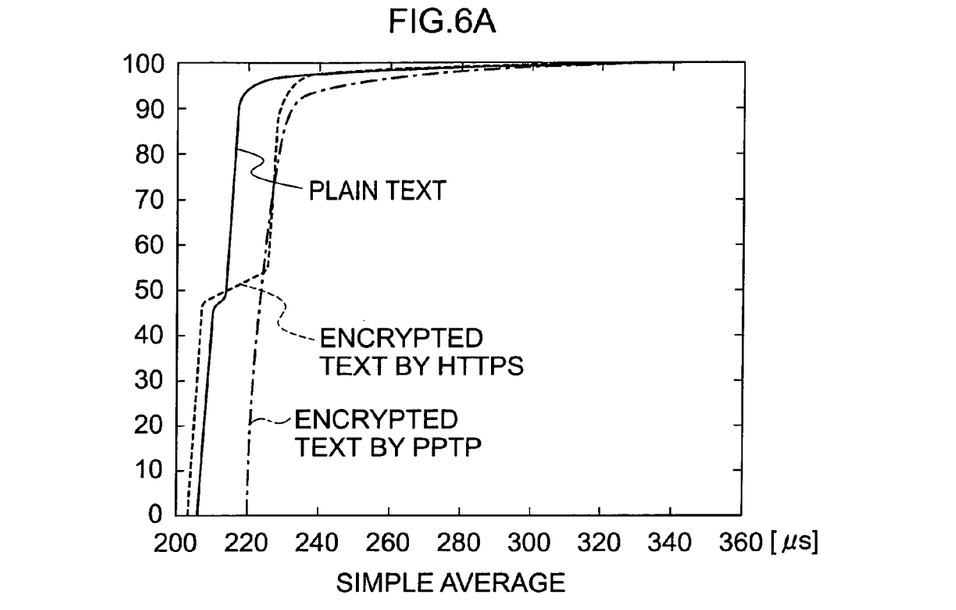
Figure 6B:
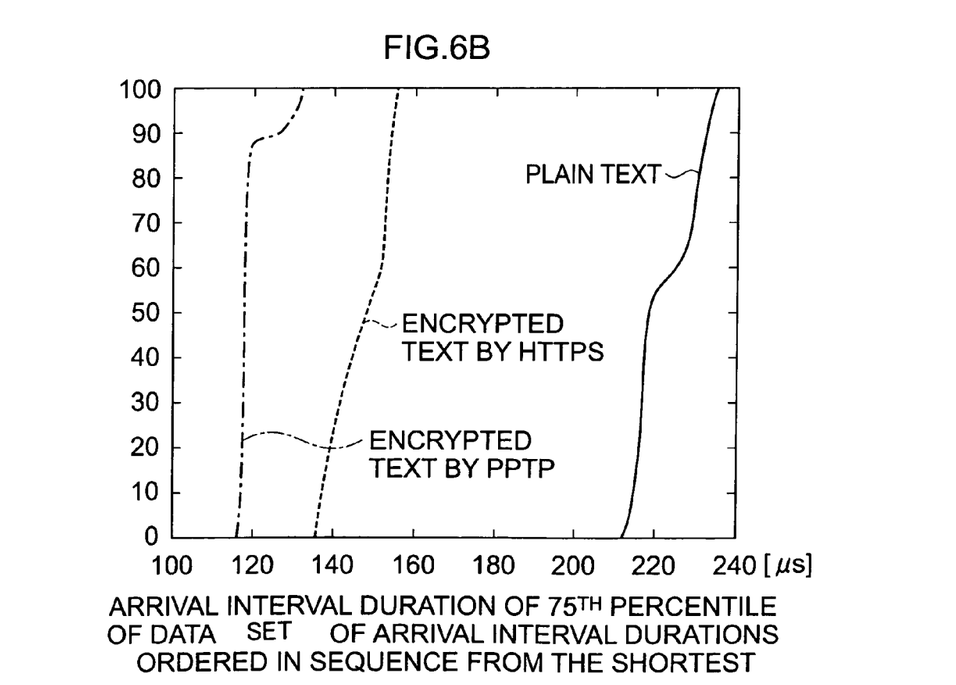
FIG. 6B is a distribution graph of evaluation computation values derived by an encrypted-traffic discrimination device according to the first exemplary embodiment, both based on arrival interval durations of packets of plain text and two types of encrypted text.

FIGS. 6A and 6B are distribution graphs of evaluation computation values based on the arrival interval durations of plain text and two types of encrypted text executed in an encrypted-traffic discrimination device employing a conventional method and the encrypted-traffic discrimination device of the first exemplary embodiment.

In the conventional method, firstly, data of 4 MB is transmitted 100 times using each of three methods: plain text; HTTPS, which is a protocol that transmits and receives data encrypted by SSL; and PPTP, which is a protocol for data transmission of encrypted text on a VPN. If the average length of the packets employed in each of the transmission sessions executed 100 times is 1000 bytes, then about 4000 individual packets are transmitted in each transmission session. However, since there are encryption and transmission protocol overheads, in reality there are not exactly 4000 packets, but slightly more than 4000 packets.

The arrival interval durations of the about 4000 packets are measured for each of the transmission sessions, from 1 to 100, average values for each of the transmission sessions are computed as evaluation computation values, and then the evaluation computation values are sorted by length, i.e., in sequence from the shortest. FIG. 6A shows a graph with the average values of the arrival interval durations of the packets on the X axis (horizontal axis), and k on the Y axis (vertical axis), wherein:

(1) the $k^{th}$ shortest value in the average values of the arrival interval durations (μs) of the packets when transmitted in plain text is denoted Ftxt (k);

(2) the $k^{th}$ shortest value in the average values of the arrival interval durations (μs) of the packets when transmitted by HTTPS is denoted Fssl (k); and (3) the $k^{th}$ shortest value in the average values of the arrival interval duration (μs) of the packets when transmitted by PPTP is denoted Fpptp (k).

As shown in FIG. 6A, with regard to the distribution of the average values of the arrival interval durations of the packets, a tendency can be seen for the transmission in the plain text to be shorter than the transmission of encrypted text by HTTPS and the transmission of encrypted text by PPTP. However, there are portions where the average values overlap (duplicates), and it can be seen that it is difficult to discriminate between whether or not the traffic subjected to monitoring is transmission of plain text or encrypted text according to particular values of the average value of the arrival interval duration.

In contrast, FIG. 6B shows a distribution of computed values derived by the following method which is employed in the present embodiments, rather than a distribution of the average values of the arrival interval duration of the packets derived by the conventional method. The conditions of data transmission are the same as in the method employed in FIG. 6A.

Firstly, the traffic subjected to monitoring is separated into flows based on the transmission IP address and the transmission port number. Then, the arrival interval durations of the packets of the flows are sorted by length in sequence from the shortest, and data at the $75^{th}$ percentile from the shortest of the data set of the sorted arrival interval durations is employed as the evaluation computation values. If, for example, that there were 4000 packets during a first transmission session, then the $75^{th}$ percentile thereof which will be the arrival interval duration of about the $3000^{th}$ packet from the shortest arrival interval duration, is employed as the evaluation computation value. Since, as explained above, there are transmission sessions 1 to 100, 100 evaluation computation values are acquired. Transmission is executed in plain text, and encrypted text by HTTPS and PTTP, and these evaluation computation values are plotted on a graph with the evaluation computation value on the X axis (horizontal axis), and the sequence number k of the evaluation computation value in the data set (100 evaluation computation values) on the Y axis (vertical axis). FIG. 6B shows the distribution of the data of the arrival interval duration of the packet at the $75^{th}$ percentile from the shortest in the data set sorted by length. In FIG. 6B, for convenience and graph clarity, each of the data sets of the evaluation computation values of the plain text, the encrypted text transmitted by HTTPS, and the encrypted text transmitted by PPTP are shown by further sorted by length, in sequence from the shortest of these values.

As in the above manner, when the graph is plotted with the evaluation computation value, of the arrival interval duration of the packet at the $75^{th}$ percentile from the shortest, of the arrival interval durations sorted by length, rather than the average value of the arrival interval durations of the packets, then correct discrimination can be made of whether the traffic subjected to monitoring is plain text or encrypted text. Furthermore, when the traffic is encrypted text, correct discrimination of encryption format used in the traffic (in the present exemplary embodiment, encrypted text according to HTTPS or encrypted text according to PPTP) can be made.

Exemplary Method 2

Figure 7A:
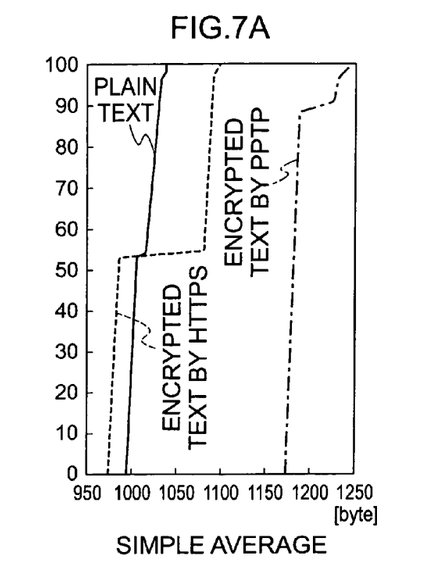
Figure 7B:
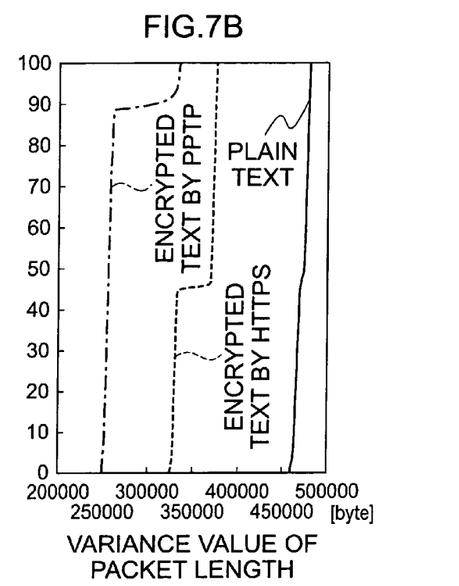
FIGS. 7B and 7C are distribution graph of evaluation computation values derived by an encrypted-traffic discrimination device according to the first exemplary embodiment, all based on packet lengths of packets of plain text and two types of encrypted text.
Figure 7C:
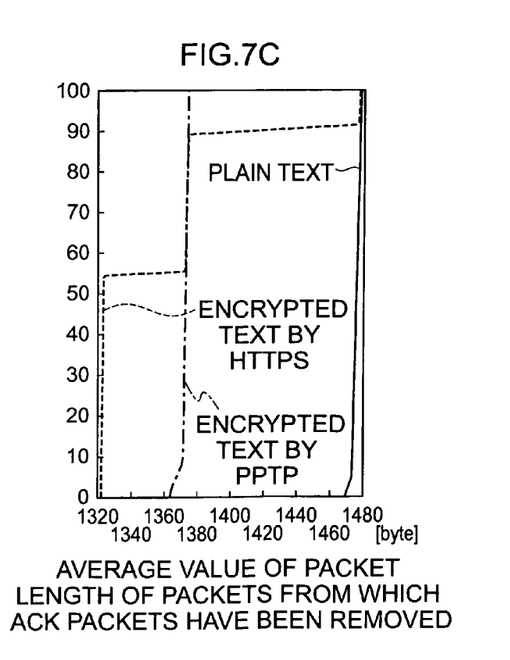

FIGS. 7A to 7C are distribution graphs of evaluation computation values based on packet lengths of plain text and two types of encrypted text executed in an encrypted-traffic discrimination device using a conventional method and in the encrypted-traffic discrimination device according to the first exemplary embodiment. In FIGS. 7A to 7C, the conditions for data transmission are similar to those in the exemplary method 1.

First, explanation regarding the distribution of the evaluation computation values shown in FIG. 7A is given.

Firstly, assumed that the total number of packets in each transmission session from 1 to 100 is 4000, the packet length of these 4000 packets is measured. Then the average value of the packet lengths is computed as the evaluation computation values. Then, these average values are sorted in sequence in a data set from the shortest average value, and plotted on a graph with the average values of the packet lengths, which are the evaluation computation values, on the X axis (horizontal axis), and the sequence number k in a data set of the evaluation computation values (100 evaluation computation values) on the Y axis (vertical axis). Accordingly, FIG. 7A shows the distribution of the average values of the packet lengths of the packets.

As shown in FIG. 7A, which is similar to the distribution shown in FIG. 6A, the result is that the traffic subjected to monitoring cannot be clearly discriminated as being transmission of plain text or encrypted text in all cases.

Next, explanation will be given for the distribution of the evaluation computation values shown in FIG. 7B.

Firstly, assumed that the total number of packets in each of the transmission sessions 1 to 100 is the same as in FIG. 7A, i.e., 4000, and the packet length is measured for these 4000 packets. Then the variance value, rather than the average values, of the packet lengths is computed, and these variance values are taken as the evaluation computation values. Then, these variance values are sorted by length of a data set, and are plotted on a graph with the variance values of the packet lengths, which are the evaluation computation values, on the X axis (horizontal axis), and the sequence number k in the data set of the evaluation computation values (100 evaluation computation values) on the Y axis (vertical axis). Accordingly, FIG. 7B shows the distribution of the variance values of the packet lengths of the packets.

As shown in FIG. 7B, by plotting as the evaluation computation values the variance values, rather than the average values, of the packet lengths of the packets, there is a tendency to be relatively correctly discriminate whether the traffic being monitored is plain text or encrypted text, in comparison to FIG. 7A.

Explanation will be given for the distribution of evaluation computation values shown in FIG. 7C.

Firstly, assumed that the total number of packets in each of the transmission sessions 1 to 100 is the same as in FIG. 7A, i.e., 4000, and the packet length is measured only for packets excluding ACK packets. Then the average value of the packet lengths of the packets excluding the ACK packets (referred to below as the ACK excluded average value) is computed as the evaluation computation values. Then, the ACK excluded average values are sorted by length of a data set, and are plotted on a graph with the ACK excluded average values, which are the evaluation computation values, on the X axis (horizontal axis), and the sequence number k in the data set of the evaluation computation values (100 evaluation computation values) on the Y axis (vertical axis). Accordingly, FIG. 7C shows the distribution of the ACK excluded average values.

As shown in FIG. 7C, by plotting as the evaluation computation values a graph of the ACK excluded average values, rather than simple average values, of the packet lengths of the packets, in comparison to FIG. 7A, and similar to FIG. 7B, discrimination can be more clearly made at to whether the traffic subjected to monitoring is plain text or encrypted text.

In the above manner, the evaluation computation values of the exemplary embodiments derived using the above described methods can be employed in order to discriminate easily, and with high precision, whether or not traffic is encrypted text or plain text. Note that, the evaluation computation values can be derived by appropriately adjusting the parameters, such as, for example, the number of packets, according to the configuration of the system.

Consequently, setting of each of the parameters for deriving the above evaluation computation values can be changed according to the system configuration and circumstances, and there is no particular limitation thereto.

As explained above, the encrypted-traffic discrimination devices according to the exemplary embodiments enable easier encryption discrimination, at high precision, between encrypted text and plain text, in comparison to conventional technology, and when the traffic is encrypted text, discrimination of the encryption format is enabled.

Furthermore, since the system according to the fourth exemplary embodiment is provided with the above encrypted-traffic discrimination device, easier encryption discrimination is enabled, at high precision, between encrypted text and plain text, in comparison to conventional technology, and when the traffic is encrypted text, discrimination of the encryption format is enabled, thereby the amount of data used for the encryption discrimination can be reduced.

What is claimed is:

1. An encrypted-traffic discrimination device, comprising:
a hardware computing device, and
a non-transitory medium having instructions stored thereon, execution of which by the hardware computing device causes the encrypted-traffic discrimination device to provide the functions of:
an input interface to which traffic is input;
a flow discrimination section that discriminates the input traffic into separate flows based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes a threshold value determination to determine whether or not the traffic is encrypted, and, if the traffic is determined to be encrypted, with which encryption format is the traffic encrypted; and
an output interface that outputs a result of the determination, where
the accumulated characteristic amount data comprises an arrival interval duration between arrivals of packets included in the traffic;
the selective data calculation section sorts a data set of the arrival interval durations by length, and takes, as an evaluation computation value, arrival interval durations of a specific section of the sorted data set of arrival interval durations, or computes, as the evaluation computation value, an average value of a specific range of the data set of arrival interval durations; and
from the data set of arrival interval durations sorted by length, the selective data calculation section takes, as the evaluation computation value, an arrival interval duration in the vicinity of the 75th percentile from the shortest arrival interval duration, or computes, as the evaluation computation value, the average value of arrival interval durations in a range of the 0th percentile to the 75th percentile from the shortest arrival interval duration of the data set.

2. The encrypted-traffic discrimination device of claim 1, wherein the characteristic amount data comprises packet lengths of packets of the traffic.

3. The encrypted-traffic discrimination device of claim 2, wherein the selective data calculation section computes variance values of a data set of the packet lengths as the evaluation computation values.

4. The encrypted-traffic discrimination device of claim 2, wherein the selective data calculation section computes the average value of the packet length of packets of the traffic, excluding ACK (acknowledgement) packets.

5. An encrypted-traffic discrimination device, comprising:
a hardware computing device, and
a non-transitory medium having instructions stored thereon, execution of which by the hardware computing device causes the encrypted-traffic discrimination device to provide the functions of:
an input interface to which traffic is input;
a flow discrimination section that discriminates the input traffic into separate flows based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes a threshold value determination to determine whether or not the traffic is encrypted, and, if the traffic is determined to be encrypted, with which encryption format is the traffic encrypted; and
an output interface that outputs a result of the determination, where the accumulated characteristic amount data comprises an arrival interval duration between arrivals of packets included in the traffic; and the selective data calculation section sorts the data set of the arrival interval durations by length, and computes an arrival interval duration index value for an $x^{th}$ arrival interval duration which is in a range from the $0^{th}$ percentile to a specific nth percentile (the $n^{th}$ percentile denoting a range between 0 and n/100) of the data set sorted by length, counting from the shortest arrival interval duration, as the evaluation computation value, according to the following equation:

$$\text{arrival interval duration index value} = \Sigma\{(x^{th} \text{ arrival interval duration})^2/(a+(x/N-(n/100)^2)\},$$

where

N denotes the total data count of the data set, and a denotes a specific constant.

6. The encrypted-traffic discrimination device of claim 5, wherein the selective data calculation section computes the evaluation computation values taking the $75^{th}$ percentile as the specific $n^{th}$ percentile.

7. An encrypted-traffic discrimination device, comprising:
a hardware computing device, and
a non-transitory medium having instructions stored thereon, execution of which by the hardware computing device causes the encrypted-traffic discrimination device to provide the functions of:
an input interface to which traffic is input;
a flow discrimination section that identifies separate flows of the input traffic based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes a threshold value determination to determine whether or not the traffic is encrypted, and, if the traffic is determined to be encrypted, with which encryption format is the traffic encrypted;
an output interface that outputs a result of the determination; and
an optimization execution section that dynamically optimizes conditions of determining whether or not the traffic is encrypted, by accessing the accumulated characteristic amount data, and, based on the accumulated characteristic amount data, dynamically changing operation of each of the flow discrimination section, the data accumulation section, the selective data calculation section and the calculation result determination section, where during the optimization of the conditions, the optimization execution section selects, as the characteristic amount data accumulated in the data accumulation section, arrival interval durations at the input interface between each packet of the traffic, or packet lengths of the packets of the traffic, and the optimization execution section sets, as initial settings for optimizing the conditions, the arrival interval durations as the characteristic amount data for accumulation in the data accumulation section, and arrival interval durations at a specific location of the data set of the arrival interval durations as the evaluation computation values in the selective data calculation section.

8. The encrypted-traffic discrimination device of claim 7, wherein the optimization execution section optimizes the conditions such that the difference between the accumulated characteristic amount data of the traffic that has been encrypted and the accumulated characteristic amount data of the traffic that has not been encrypted is substantially at a maximum.

9. The encrypted-traffic discrimination device of claim 7, wherein the optimization execution section optimizes the conditions such that duplicate portions of the accumulated characteristic amount data of the traffic that has been encrypted and the accumulated characteristic amount data of the traffic that has not been encrypted are substantially at a minimum.

10. The encrypted-traffic discrimination device of claim 7, wherein, in order to optimize the conditions, when the evaluation computation is performed in the selective data calculation section based on the characteristic amount data, the optimization execution section causes the selective data calculation section to select the characteristic amount data to be employed, or a range of the data set of the characteristic amount data to be employed.

11. The encrypted-traffic discrimination device of claim 7, wherein, in order to optimize the conditions, the optimization execution section causes the calculation result determination section to select a threshold value used for the evaluation computation result to determine whether or not the traffic is encrypted, and to determine which encryption format is used when the traffic is encrypted.

12. An encrypted-traffic discrimination device, comprising:
a hardware computing device, and
a non-transitory medium having instructions stored thereon, execution of which by the hardware computing device causes the encrypted-traffic discrimination device to provide the functions of:
an input interface to which traffic is input;
a flow discrimination section that identifies separate flows of the input traffic based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes threshold value determination to determine whether or not the traffic is encrypted, and, if the traffic is determined to be encrypted, with which encryption format is the traffic encrypted;
an output interface that outputs a result of the determination;
an optimization execution section that dynamically optimizes conditions of determining whether or not the traffic is encrypted, by accessing the accumulated characteristic amount data, and, based on the accumulated characteristic amount data, dynamically changing operation of each of the flow discrimination section, the data accumulation section, the selective data calculation section and the calculation result determination section; and
a traffic abnormality detection section disposed at a stage preceding the input interface, the traffic abnormality detection section being configured to output abnormal traffic and data relating to a source of the abnormality upon detecting an abnormality in the traffic, where when an abnormal flow is detected in the traffic, the flow discrimination section generates data relating to the source of the abnormal flow, and the output interface outputs the data relating to the source of the abnormal flow.

13. An encrypted-traffic discrimination system, comprising:

an encrypted-traffic discrimination device that includes
a hardware computing device, and
a non-transitory medium having instructions stored thereon, execution of which by the hardware computing device causes the encrypted-traffic discrimination device to provide the functions of:
an input interface to which traffic is input;
a flow discrimination section that discriminates the input traffic into separate flows based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes a threshold value determination to determine whether or not the traffic is encrypted, and, if the traffic is determined to be encrypted, with which encryption format is the traffic encrypted; and
an output interface that outputs a result of the determination, where
the accumulated characteristic amount data comprises an arrival interval duration between arrivals of packets included in the traffic; and
the selective data calculation section sorts the data set of the arrival interval durations by length, and computes an arrival interval duration index value for an $x^{th}$ arrival interval duration which is in a range from the $0^{th}$ percentile to a specific nth percentile (the $n^{th}$ percentile denoting a range between 0 and n/100) of the data set sorted by length, counting from the shortest arrival interval duration, as the evaluation computation value, according to the following equation:

$$\text{arrival interval duration index value} = \Sigma\{(x^{th} \text{ arrival interval duration})^2/(a+(x/N-(n/100)^2))\},$$

where
N denotes the total data count of the data set, and
a denotes a specific constant; and
a test signal transmission device, disposed internally or externally with respect to the encrypted-traffic discrimination device, and transmitting encrypted or non-encrypted test traffic, where the encrypted-traffic discrimination device determines with respect to the test traffic received from the test signal transmission device whether or not the test traffic is encrypted, and determines which encryption format is used when the test traffic is encrypted.

14. An encrypted-traffic discrimination device, comprising:

a hardware computing device, and
a non-transitory medium having instructions stored thereon, execution of which by the hardware computing device causes the encrypted-traffic discrimination device to provide the functions of:
an input interface to which traffic is input;
a flow discrimination section that identifies separate flows of the input traffic based on at least a transmission origin address and a transmission destination address;
a data accumulation section that accumulates characteristic amount data of the traffic for each of the separate flows;
a selective data calculation section that executes an evaluation computation utilizing specific data from the accumulated characteristic amount data;
a calculation result determination section that, based on a calculated evaluation computation value, executes a threshold value determination to determine whether or not the traffic is encrypted, and, if the traffic is determined to be encrypted, with which encryption format is the traffic encrypted;
an output interface that outputs a result of the determination; and
an optimization execution section that dynamically optimizes conditions of determining whether or not the traffic is encrypted, by accessing the accumulated characteristic amount data, and, based on the accumulated characteristic amount data, dynamically changing operation of each of the flow discrimination section, the data accumulation section, the selective data calculation section and the calculation result determination section, where the optimization execution section selects an optimum computation method for the determination of whether or not the traffic is encrypted, and causes the calculation result determination section to perform the determination of whether or not the traffic is encrypted using a result obtained from the optimum computation method, and the optimization execution section selects the optimum computation method while the encrypted-traffic discrimination device performs a series of steps for the determination of whether or not the traffic is encrypted, and causes the calculation result determination section to perform the determination using the result obtained from the optimum computation method.

* * * * *